UNITED STATES PATENT OFFICE 2,388,279

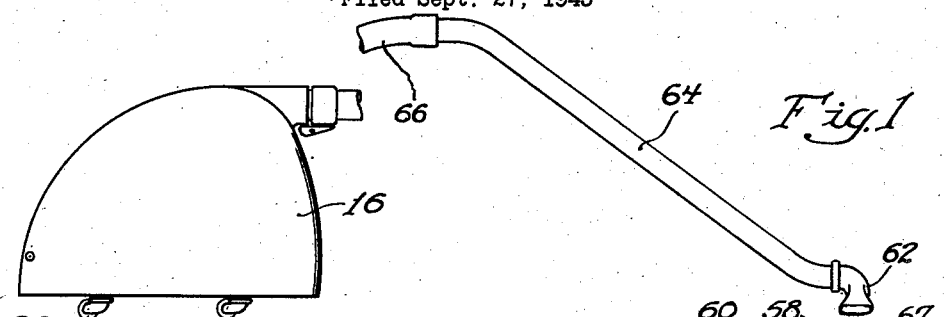
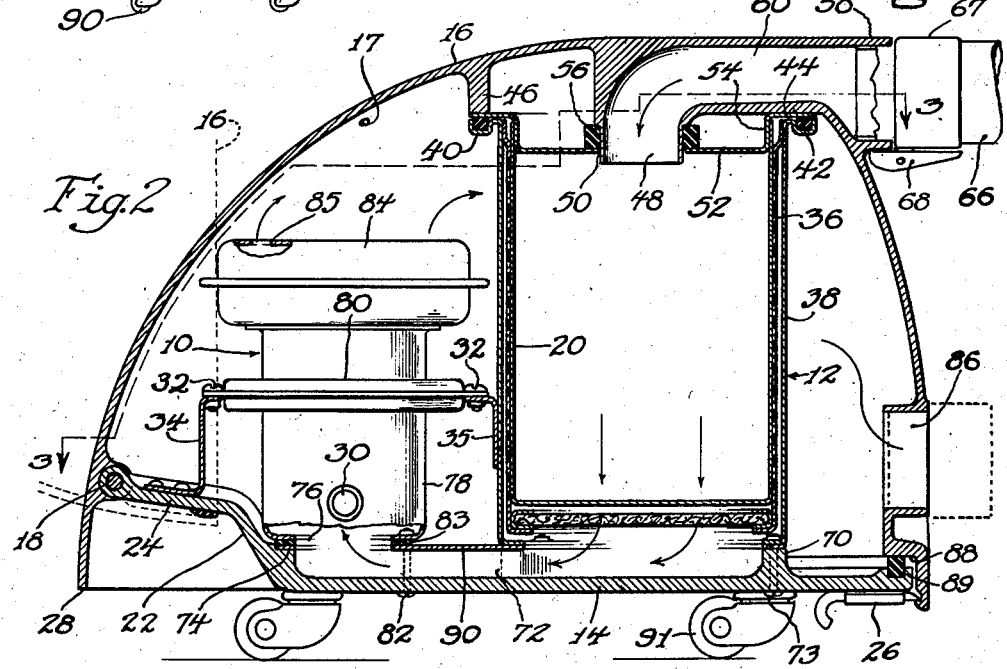
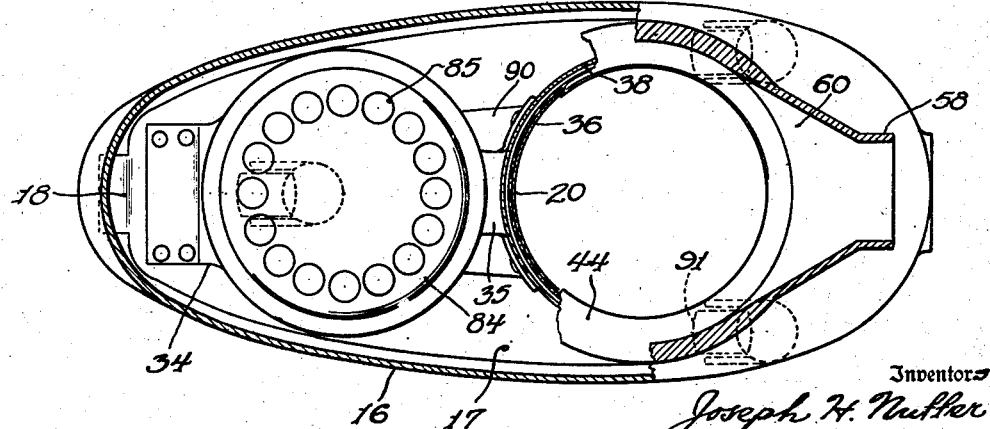

SUCTION CLEANER

Joseph H. Nuffer, Toledo, Ohio, and Lynn H. Latta, Deerfield, Ill., assignors to Air-Way Electric Appliance Corporation, Toledo, Ohio, a corporation of Delaware Application September 27, 1943, Serial No. 503,916

5 Claims. (Cl. 183—37)

This invention relates to suction cleaners of the type in which the filtering and suction units are both enclosed within a rigid housing to which which a dust-laden air stream is led through a flexible suction hose from a cleaning tool. One of the objects of the invention is to provide a suction cleaner of this type wherein the filtering unit has the advantage of being arranged vertically or substantially vertically and the hose is connected to the housing in such a position as to attain maximum efficiency in the conveyance of a dust-laden air stream into the filtering and collecting unit, and yet the center of gravity of the enire body of the cleaner is sufficiently low and the weight is sufficiently distributed horizontally so that the cleaner body may be dragged about by the suction hose without being tipped over by the pull of the hose.

Another object of the invention is to provide such a cleaner wherein the suction unit is coupled closely to the filtering and dust collecting unit so as to obtain maximum efficiency in the application of suction to the filtering unit. A further object is to provide an arrangement wherein the space within a streamlined housing, such as, for example, of "tear drop" shape, is utilized so as to obtain maximum compactness. Another object is to provide a cleaner of the type indicated wherein both the filtering and suction units can be quickly and easily exposed for servicing, and wherein a sealed connection between the suction hose and filtering unit may be easily and readily established.

Toward the attainment of the foregoing objects, the invention contemplates an arrangement wherein the filtering and suction units are mounted side by side upon a base and enclosed between the base and a dome shaped cover member which is adapted to be lifted with the suction and filtering units completely or almost completely exposed above the base when the cover is thus lifted and wherein the cover is provided with means for establishing a sealed connection between the suction hose and the filtering unit as an incident to the closing of the cover.

Another object of the invention is to provide a vacuum cleaner which in addition to the characteristics set forth above, has provision for a blower connection direct to the casing thereof. These and other objects of the invention will become apparent from a perusal of the following specifications taken in connection with the accompanying drawing, in which:

Fig. 1 is a side elevation of a suction cleaner embodying the invention.

Fig. 2 is a longitudinal vertical sectional view of the main body portion of the cleaner.

Fig. 3 is a horizontal sectional view of the same, taken as indicated by the line 3—3 of Fig. 2.

As an example of one form in which the invention may be embodied, we have shown in the drawing a suction cleaner wherein the suction unit, indicated generally at 10, and the dust collecting and air filtering unit, indicated generally at 12, are mounted in side by side relationship upon a low base 14 with the axis of both units vertical or substantially vertical, and wherein a cover 16 is adapted to form, together with the base 14, a housing enclosing a chamber 17 in which the suction and filtering units 10 and 12 are accommodated.

While the axis of the filtering unit 12 may not be exactly vertical, it is preferred to have it arranged on a generally vertical axis, in order that the dust laden air stream may enter the filtering and collecting receptacle 20 at the upper end thereof, thus leaving the entrance portion of the receptacle always clear until the receptacle is substantially full of collected dust and refuse.

The cover 16 is generally dome shaped, the wall thereof being extended downwardly around all sides of the suction and filtering units 10 and 12, to the plane of the base 14. The rear portion of the base 14 is offset upwardly as at 22, and thence extended rearwardly as at 24 to the hinge 18. A latch 26 normally latches the lower forward portion of the cover 16 to the base 14. By releasing the latch 26, the cover 16 may be lifted to the position indicated in dotted lines, wherein its lower edge extends vertically and the suction and filtering units 10 and 12 are substantially completely exposed. The cover will be supported in this raised position by engagement of the tail portion 28 thereof against the lower surface of the raised extended portion 24 of the base 14 as indicated by the dotted lines.

With the cover 16 in the raised position, the carbon brushes 30 and the screws 32 by means of which the suction unit 10 is mounted on supporting brackets 34 and 35, are fully exposed for servicing operations.

The filtering unit 12 includes the receptacle 20, a perforated supporting liner 36 encircling the receptacle 20, and a tubular casing 38 encircling and spaced from liner 36. At the upper end of the casing 38 is an annular channel 40 in which is mounted a ring 42 of compressible material such as for example soft rubber, and the receptacle 20, which is preferably of porous paper so that it may be disposed of when filled, is provided at its upper end with a non-porous flange 44 resting upon the packing ring 42. The cover 16 is formed with an annular clamping flange 46 adapted to clamp the flange 44 against the packing ring 42, and with a delivery nozzle 48 receivable in a central opening 50 in a non-porous top member 52 which is secured to the receptacle 20. The top member 52 may be connected integrally with the flange 44 by an offset portion 54 by means of which the top member is stitched to the receptacle 20. The nozzle 48 carries a sealing ring 56 of compressible material such as soft rubber, which is adapted to seal the nozzle to the top 52. The parts are so arranged that the sealing of the nozzle 48 to the top 52 and the clamping of the flange 44 against the packing ring 42 is effected by moving the cover 16 to a closed position and latching it in that position. Conversely, the raising of the cover 16 to the vertical position uncovers the filtering unit so that a filled receptacle 20 may be removed and replaced by a fresh receptacle.

Formed in the cover 16 is an inlet 58 which is connected to the nozzle 48 by a short duct 60. The floor tool 62 of the cleaner, mounted on the end of a wand 64, is adapted to be connected to the filtering unit by a flexible suction hose 66, having on one end a suitable connector 67 for connection to the inlet 58. The connector 68 may if desired incorporate a swivel to permit swiveling of the hose relative to the body of the cleaner. Suitable means, such as the latch 68, may be employed for connecting the hose to the inlet 58 in such a manner as to transmit the pull of the hose to the body of the cleaner.

The casing 38 of the filtering unit 12 is mounted at its lower end upon an annular flange 70 formed integrally with the base 14 and constituting one end of a duct 72 adapted to apply suction to the lower end of the casing 38. The annular flange 70 defines a circular port communicating with the open lower end of the casing 38. An inturned flange 71, on the lower end of the casing 38 provides the means for attaching the casing 38 to the duct flange 70 in connection with suitable attaching elements such as the screws 73, extended upwardly through the base 14 and the flange 70, and threaded into the flange 71.

The other end of the duct 72 is formed with an annular shoulder 74 defining a port communicating with a suction inlet 76 in the lower end of the motor casing 78 of the suction unit 10. The casing 78 is mounted on the brackets 34 and 35 thru the medium of a vibration dampener mounting 80, and may also be attached at its lower end to the shoulder 74 by means of screws 82, with a cushioning gasket 83 interposed. The casing 78 encloses an electric motor (not shown).

Mounted upon the upper end of the motor casing 78 is the fan casing 84 in which the suction fan (not shown on the drawing) is driven by the motor in casing 78. From the discharge apertures 85 of the fan casing 84, the air is discharged into the chamber 17 and escapes from this main chamber through a blower outlet 86. The blower outlet 86 is adapted to receive the hose connection 67 so that the hose 66 may be used as a means for attaching blowing implements or other air pressure operated implements to the cleaner. In order that sufficient pressure may be delivered at the outlet 86, the cover 16 is provided with a shoulder 88 which is adapted to seal against a gasket 89 in the base 14, thus rendering the main chamber substantially airtight.

The cleaner is supported upon casters 91 which may be arranged in tricycle formation as indicated in dotted lines in Fig. 3, and which permit the cleaner to be dragged about behind the operator by the hose 66.

The inlet 58 is located at the upper end of the cover 16 so as to provide the most direct line of entry of the dust laden air stream into the filtering unit, and so as to support the hose at the maximum distance from the floor at both ends, thereby avoiding dragging the hose against the floor. The distribution of weight is such however as to avoid any tendency of the cleaner to tip over under the pull of the hose. This is accomplished by arranging the filtering and suction units as low as possible without sacrificing the advantages of having the filter unit arranged on a vertical or generally vertical axis.

In order to facilitate construction of the base 14, the duct 72 may be formed with lateral walls integral with the base 14 and with a separate top wall 90 of sheet metal or the like, secured to the flange 70, shoulder 74, and the side walls of the duct 72 connecting the flange 70 and shoulder 74.

It may now be noted that the construction is such as to facilitate streamlining of the housing portion of the cleaner, the visible portion of which comprises the cover 16, and proportioning it in such a manner that the center of gravity is sufficiently low to avoid tipping under the pull of the hose. It also permits ready access to all working parts by simply unlatching the cover and lifting it to an upstanding position. It incorporates the advantages of a dust collecting and filtering unit arranged vertically and with its inlet at the top. It provides for the selective connection of either suction or blowing tools. It provides an arrangement wherein a filled recepetacle may be quickly removed and replaced by an empty receptacle, and provides for the automatic sealing of the cover and inlet to the receptacle when the cover is moved to closed position and latched in that position. It provides a close coupled suction connection between the suction unit and the filtering unit.

In the operation of the cleaner, air is drawn from the duct 72 upwardly through the motor casing 78 and is discharged from the fan casing 84 into the chamber 17. From the chamber 17 it passes to the atmosphere through the blower outlet 86. The suction applied to the duct 72 draws a dust-laden air stream through the tube 66 and nozzle 48 into the receptacle 20, the suction being applied to the lower end of the casing 38 by the duct 72, and thence to the annular space between the liner 36 and the casing 38.

It is contemplated that the cover 16, or both the cover 16 and base 14, may be formed of plastic material by suitable plastic molding process. This would make it possible to incorporate any desired ornamentation and color in the external surface of the cleaner, and would provide lightness coupled with adequate strength.

We claim as our invention:

1. In a suction cleaner, a base, a suction unit on said base, a filtering unit on said base in communication with said suction unit, said filtering unit including an upright casing and a dust collecting unit within said casing, said dust collecting unit having a foraminous wall and an inlet aperture, a cover cooperating with said base to enclose said units, means carried by and movable with the cover forming a portion of the air inlet duct and cooperating with said inlet aperture to direct dust-laden air into said dust collecting unit, and a mounting for said cover enabling same to be moved to a position freely to expose said suction and filtering units and enable ready inspection of said dust collecting unit.

2. A suction cleaner as claimed in claim 1, wherein said base is generally flat and said cover is dome-shaped with the side walls thereof enclosing the top and side portions of the suction and filtering units.

3. A suction cleaner as claimed in claim 1 wherein said cover mounting comprises a hinged connection with said base at a point remote from said tube to enable the tube to be swung free of said dust collecting unit.

4. A suction cleaner as claimed in claim 1 wherein said cover mounting comprises a hinged connection with said base at a point remote from said tube to enable the tube to be swung free of said dust collecting unit, said cover having a blower outlet, and means for sealing the cover to said base thereby to provide a substantially air-tight chamber for conducting the discharge from the suction unit to the blower outlet.

5. In a suction cleaner, a base, a duct attached to said base, said duct having an upwardly opening inlet and upwardly disposed outlet, a suction unit connected to the outlet portion of said duct, a filtering unit including an imperforate casing mounted upon the inlet portion of said duct and extending vertically upwardly and including a porous duct collecting receptacle within said casing, said receptacle having an outwardly extending flange adapted to rest upon the upper end of the casing, and a cover hinged to the base at a point remote from the filtering unit, said cover being adapted to be raised to a position wherein said filtering and suction units are exposed for servicing operations, and said cover having means adapted, when it is closed, to clamp said flange against the upper end of said casing for supporting said receptacle and including an inlet adapted to establish communication with said receptacle when the cover is closed.

JOSEPH H. NUFFER.
LYNN H. LATTA.